April 25, 1933.   J. C. SHARP   1,905,309
TRUNNION FOR LOCOMOTIVE VALVE MOTIONS
Filed March 3, 1930
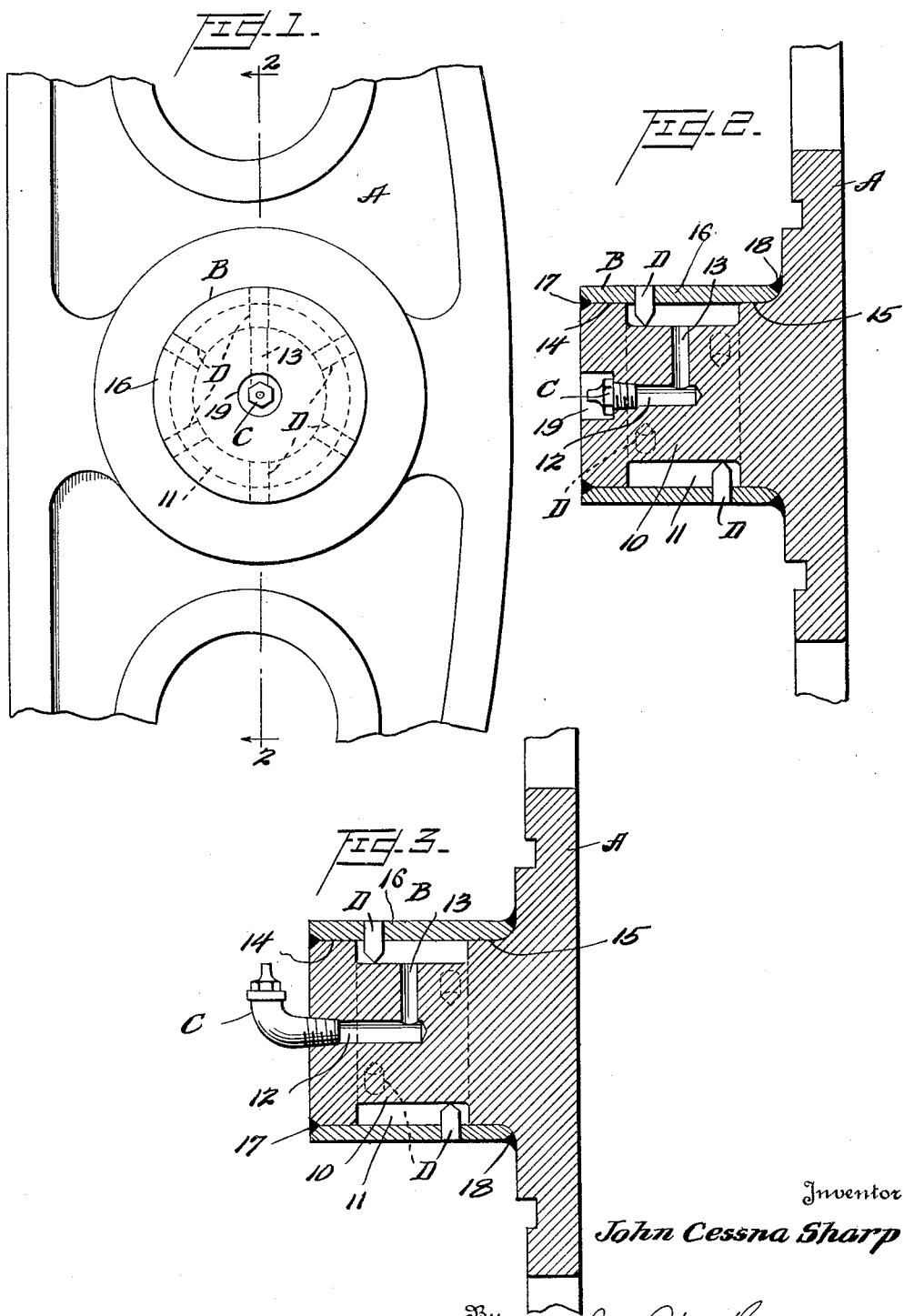
Inventor
John Cessna Sharp
By C. J. Stockman
Attorney Patented Apr. 25, 1933

1,905,309

UNITED STATES PATENT OFFICE

JOHN CESSNA SHARP, OF CHATTANOOGA, TENNESSEE, ASSIGNOR TO NATHAN MANUFACTURING COMPANY, OF NEW YORK, N. Y., A CORPORATION OF NEW YORK

TRUNNION FOR LOCOMOTIVE VALVE MOTIONS

Application filed March 3, 1930. Serial No. 432,897.

One purpose of this invention is to provide a boss, trunnion or the like, hereinafter called "trunnion" for brevity's sake, of self-lubricating nature. Another of the purposes is to provide a trunnion whose construction is such that its external surface is continuously supplied with lubricating oil fed thereto in minute amounts whereby said surface is effectively lubricated with great economy in the amount of oil used. Another, and very important purpose of the invention is to provide a trunnion with an oil reservoir and with oil attracting and conducting elements which are formed of wood and extend from the reservoir to the surface of the trunnion, and are characterized in that they operate to feed the oil continuously and in minute amounts from the oil reservoir to the surface of the trunnion, prevent the passage of sand, grit, and other hard foreign substances with the oil to said surface, do not become clogged, and do not become either glazed over or carbonized at their ends in contact with a surface to be lubricated.

In accordance with the foregoing purposes each oil attracting and conducting element is formed of a suitable non-porous wood, white pine being preferred, subjected to a special treatment to increase its oil attracting and conducting qualities.

Another of the important objects of the invention is to provide the trunnion with a means by which its reservoir may be filled with oil forced thereinto under heavy pressure and which means will be readily accessible. This means may, if desired, form a part of a centralized system by which the oil in the trunnion reservoir may be replenished at the same time other parts of the mechanism of which the trunnion forms a part (a locomotive valve motion, for example) are supplied with oil. To this end, I have provided the reservoir inlet of the trunnion with a suitable fitting, preferably of the Zerk type.

Having thus in a general way set forth the purposes and nature of the invention, I will now describe a practical embodiment thereof, reference being had to the accompanying drawing in which:

Fig. 1 is an end elevation of a member of a valve motion which includes a trunnion constructed in accordance with this invention;

Fig. 2 is a vertical section thereof on the line 2—2 of Fig. 1 and

Fig. 3 is a view similar to Fig. 2, but showing a slightly changed shape of the pressure fitting.

Referring to the drawing, the part designated A exemplifies a member which serves as a support for the trunnion B and which member, in practice, may be of any suitable style or construction, appropriate to the particular mechanism of which it is to form a part. The trunnion B projects laterally from said supporting member A and has its body 10 formed integral with the latter. This body 10 is formed with a circumferential recess 11 and with ducts 12 and 13 whose inner ends are in an intersecting relation. The duct 12 extends from one end of the body 10 longitudinally of the latter and the duct 13 extends from the inner portion of the duct 12 to the recess 11. Said recess 11 is so arranged as to provide shoulders 14 and 15 at the outer and inner ends of the trunnion. A cylindrical member 16 has its opposite ends seated upon these shoulders 14 and 15 and is rigidly secured to the body 10, as indicated at 17 and 18, by welding or by any other suitable means, to thereby become substantially integral with the member A and body 10. An oil reservoir which is closed on all sides by the body 10, shoulders 14 and 15 and cylinder 16 is provided by said recess. This reservoir, as will be apparent, may be filled with lubricating oil through the ducts 12 and 13. C in Fig. 2, and C' in Fig. 3 designate fittings of the pressure type through which oil is admitted to the respective ducts 12. In the particular form illustrated in Fig. 2 the fitting (C) is straight throughout its length and its outer end portion is arranged within an opening 19 formed in the outer end of the body 10 and is of such size relatively to the outer end portion of the fitting that the latter will lie wholly inside said body. The particular fitting C' shown in Fig. 3 is intended for situations in which access thereto would be inconvenient if it were arranged wholly within the body of the trunnion. It includes a goose neck or elbow which projects from the end of the trunnion and has its outer end provided with an appropriate fitting. The fitting preferably employed is of the type known as the Zerk and hence requires no detail illustration or further description.

Each oil attracting and conducting element hereinbefore referred to and designated D in all figures of the drawing is in the form of a peg or plug, hereinafter called "plug", whose inner extremity tightly abuts against the inner wall of the reservoir and whose outer end portion is fitted tightly, under pressure, in an opening formed in the cylinder 16, the intermediate portion of the plug extending across the oil reservoir. There are a series of these plugs suitably arranged to attract the oil in the reservoir and conduct it to the outer surfaces of the trunnion at different places in the area of said surface.

Each plug is formed of a suitable wood of the coniferous group—white pine, being preferred. These woods are characterized, in part, by an absence of pores and hence are classified as "non-porous" woods. They are also characterized, in part, by the presence therein of resins, etc. in varying amounts according to the particular species and the particular condition of the wood.

White pine and other woods of the, so-called, non-porous group when in the raw state are such poor conductors of lubricating oil as to be impracticable for use in this invention, but when subjected to treatment by which natural liquid and gaseous substances contained in such woods are removed, under conditions which assure thorough impregnation of the wood with lubricating oil, the wood is thereby converted to a condition which makes it suitable for the purpose of this invention.

In carrying out this treatment, the rounded strips of the wood from which the plugs are later cut, or said plugs after being cut from the strips, the latter being preferred, are first subjected to a bath of hot lubricating oil. When the strips of wood, or the plugs, as the case may be, are first immersed in the hot bath, there is a very pronounced agitation of the oil which forms the bath, presumably due to the release of gaseous or liquid substances contained in the wood. When this agitation ceases the strips or plugs may be immersed in a separate bath of oil, which latter may be unheated. When the strips or plugs sink to the bottom of the bath of either hot or unheated oil they are ready for use, either immediately or at any subsequent period, since their sinking demonstrates that they have been thoroughly impregnated with oil and are sufficiently conductive for the purpose intended. But those strips or plugs which do not sink should be discarded, since their failure to sink evidences that they are not sufficiently oil absorbent to form satisfactory oil conductors.

Care should be exercised in the selection of the wood and, indeed, this care should extend to the selection of the plugs which are to be subjected to the bath or baths, hereinbefore referred to, since plugs cut from the same piece of wood sometimes differ in their oil attracting and conductive properties. The best results are secured from a straight-grained wood and perfect results may be expected from such a wood which has become thoroughly impregnated with oil as evidenced by its sinking in the bath.

The treatment referred to preserves the wood and renders the plugs operative immediately as attracting and conducting elements of high efficiency, additionally characterized in that they will not glaze over or become carbonized, and will not become clogged or afford opportunity for the entrance thereinto of sand, grit or other hard foreign substances or the feeding of such substances to the surface to be lubricated. In all of these respects the elements which I employ differ in operation from capillary oil feeders formed of porous wood, malacca cane, Indian rattan or other porous vegetable matter, characterized by relatively large pores or channels extending continuously from end to end of the capillary feeders. Such feeders present no bar to the entrance of sand and other hard foreign substances which may be contained in the oil and their pores soon become filled with such substances and a muck is formed which results in the glazing of the discharge ends of the feeders. Some of this foreign substance, of course, reaches the surfaces to be lubricated and, of course, is liable to mar or score such surfaces. When the ends of the feeders are glazed, flow of oil to said surfaces is interfered with. When the force of capillary attraction is supplemented by a vacuum to draw the oil through the large pores, as has been suggested in relation to malacca cane, Indian rattan and like materials, to avoid clogging of said pores, the feeding of any hard foreign substances suspended in the oil to the contacting surfaces to be lubricated is correspondingly expedited. Moreover, the feeders formed of porous woods, Indian rattan, malacca cane or the like are very wasteful of oil as long as they are operating at all.

Thus it will be seen that the structure of the trunnion is simple and inexpensive and that it not only is economical in the use of oil and effective in respect of lubricating qualities, but also has the additional advantages of feeding only clean and filtered oil to the surfaces to be lubricated and of feeding such oil unfailingly and for indefinite periods without any attention whatsoever except the replenishment of the supply of oil in the reservoir when the latter has become exhausted.

In this replenishment and also in the original filling of the reservoir, the oil is forced in under heavy pressure. This pressure, however, does not act to displace any of the oil attracting and conducting plugs, nor are any of the plugs displaced by the jars to which the trunnion may be subjected in use, as an element of a locomotive valve motion, for the reason that their outer ends are rigidly secured within the outer member 16 of the trunnion and terminate at the outer surface of said member and in position to be engaged by the part, not shown, mounted upon the trunnion while their inner extremities of the feeders are in contact with the inner wall of the reservoir. Moreover, the plugs themselves have a pressure relieving tendency when the oil is being supplied under my heavy pressure, permitting air which might otherwise be entrapped to escape through the plugs.

Having thus described the invention what I believe to be new and desire to secure by Letters Patent and what I therefore claim, is:—

1. A trunnion comprising two members located one within the other and relatively formed to provide an oil reservoir between their confronting surfaces, the inner of said members having a passageway extending from an end of said member to said reservoir and through which oil is supplied to the latter, and a plurality of oil attracting and conducting wooden plugs whose inner ends are immersed in the oil in said reservoir and whose outer ends extend through the outer member of the trunnion and are rigidly secured to the latter and terminate substantially flush with the outer surface of the trunnion.

2. A structure according to claim 1 and in which the oil attracting and conducting plugs are formed of a coniferous wood thoroughly impregnated with oil and characterized by their ability to sink in oil.

3. A structure according to claim 1 and in which the oil attracting and conducting plugs have their outer ends rigidly secured in the outer member of the trunnion and terminate substantially flush with the latter while their inner ends are in contact with the inner wall of the reservoir.

4. A structure according to claim 1 and in which there is a pressure fitting controlling the inlet of oil to the passageway.

5. A carrying member, a member forming a trunnion body substantially integral with and projecting from one side of the carrying member, a cylindrical member encircling the body and secured thereto, said body and cylindrical member relatively formed to provide a closed oil reservoir between their confronting surfaces and said body having a passageway extending from its outer end to the reservoir and through which oil is supplied to said reservoir, and a plurality of oil attracting and conducting wooden plugs whose outer ends are tightly fitted in the cylindrical member and terminate substantially flush with the outer surface of the latter and whose inner ends are immersed in the oil in the reservoir and engaged by the inner wall of said reservoir.

6. A carrying member, a member forming a trunnion body substantially integral with and projecting from one side of the carrying member, said body having a circumferential groove positioned therein to provide shoulders at its opposite ends and also having an oil inlet passageway extending from its outer end to said groove, a cylindrical member whose opposite ends are rigidly secured to said shoulders, said cylindrical member co-operating with the groove and shoulders in forming an oil reservoir, and a plurality of oil attracting and conducting wooden plugs extending from said reservoir outward through the cylindrical member.

7. A structure according to claim 5 and in which there is a pressure fitting for controlling the inlet passageway.

8. A structure according to claim 6 and in which there is a pressure fitting for controlling the inlet passageway and the oil attracting and conducting plugs have their outer ends rigidly secured to the cylinder and their inner ends in contact with the inner wall of the reservoir.

9. A structure according to claim 5 and in which each oil attracting and conducting plug is formed of a coniferous wood from which natural constituents of the wood have been removed and the wood impregnated with oil to increase its oil attracting and conducting qualities and is characterized by its ability to sink in oil.

10. A structure according to claim 6 and in which each oil attracting and conducting plug is formed of a coniferous wood which has been impregnated with oil substantially to the point of saturation to increase its oil attracting and conducting qualities and each has its outer end portion rigidly secured to said cylindrical member and its inner end portion in contact with the inner wall of the reservoir and in which also the oil inlet passageway is provided with a pressure fitting for controlling the same.

In testimony whereof I affix my signature.

JOHN CESSNA SHARP.